US006236652B1

(12) United States Patent
Preston et al.

(10) Patent No.: US 6,236,652 B1
(45) Date of Patent: May 22, 2001

(54) GEO-SPACIAL INTERNET PROTOCOL ADDRESSING

(75) Inventors: Dan A. Preston; Joseph Preston, both of Bainbridge Island, WA (US)

(73) Assignee: Airbiquity Inc., Bainbridge Island, WA (US)

( * ) Notice: Subject to any disclaimer, the term of this patent is extended or adjusted under 35 U.S.C. 154(b) by 0 days.

(21) Appl. No.: 09/432,818

(22) Filed: Nov. 2, 1999

Related U.S. Application Data (60) Provisional application No. 60/106,727, filed on Nov. 2, 1998.

(51) Int. Cl.[7] .................. H04J 3/24; G01S 1/02
(52) U.S. Cl. .................. 370/349; 701/213; 370/392
(58) Field of Search .................. 370/329, 338, 370/401, 316, 465, 466, 349, 351, 392, 389, 475; 455/433, 427, 517, 438; 701/213

(56) References Cited

U.S. PATENT DOCUMENTS

| 5,400,338 | 3/1995 | Flammer, III | 370/94.1 |
| 5,796,728 | * 8/1998 | Rondeau et al. | 370/338 |
| 5,901,352 | * 8/1998 | St-Pierre et al. | 455/426 |
| 6,047,327 | * 4/2000 | Tso et al. | 709/232 |

FOREIGN PATENT DOCUMENTS

| 0801354 A2 | 10/1997 | (EP) | G06F/15/16 |

OTHER PUBLICATIONS

Imielinski and Navas, GPS–based Addressing and Routing, RFC 2009, ITEF, Nov. 1996.*
International Search Report for international application No. PCT/US/ 99/25872, dated Mar. 15, 2000.
T. Imielinski and J. Navas: "RFC 2009: GPS–Based Addressing and Routing," IETF–Network Working Group, Nov. 30, 1996, pp. 1–27.
Douglas E. Comer, *Internetworking With TCP/IP*, vol. 1 (3rd Edition), 1995, Chapter 29, pp. 489–509.

* cited by examiner

*Primary Examiner*—Chau Nguyen
*Assistant Examiner*—Chiho Andrew Lee
(74) *Attorney, Agent, or Firm*—Stoel Rivers LLP (57) ABSTRACT

The invention provides for conversion of latitude and longitude to an addressing scheme that supports current TCP/IP (Ipv4) and future addressing (Ipv6/Ipng) requirements. More specifically, it allows a decentralization of the unicast point to a device on the hosted network. Geographical Internet Protocol (geoIP) addressing will facilitate anycast routing schemes where in which the nearest node has a statically assigned geoIP. geo routing, and network management become a function of the geoIP address.

4 Claims, 5 Drawing Sheets

IDC - GEO-SPATIAL ROUTING:using dynamic IP addressing derived from Latitude and Long...

Latitude: 45  30.345
Longitude: 122  30.678
Unresolved Dynamic IP: 128.129.173.130
Dynamic User IP: 113.137.157.215
DNS: 503.819.7491@airtouch.net
Gateway in View: 9
Negotiating: 268
Next Gateway: 77
Dynamic Virtual Gateway: 9.9.255.13
Next Gateway: 255.13.77.77

[Pos1] [Pos2]    [Clear] [Resolve IP] [Quit]

FIG. 6

IDC - GEO-SPATIAL ROUTING:using dynamic IP addressing derived from Latitude and Long...

Latitude: 45  30.345
Longitude: 122  30.678
Unresolved Dynamic IP: 128.129.173.130
Dynamic User IP: 128.129.173.130
DNS: 503.819.7491@airtouch.net
Gateway in View: 9
Negotiating: 268
Next Gateway: 77
Dynamic Virtual Gateway: 9.9.255.13
Next Gateway: 255.13.77.77

[Pos1] [Pos2]    [Clear] [Resolve IP] [Quit]

FIG. 7

GEO-SPACIAL INTERNET PROTOCOL ADDRESSING

This application claims benefit to U.S. provisional application No. 60/106,727, filed Nov. 2, 1998.

TECHNICAL FIELD

The present invention is generally in the field of data communications and more specifically is directed to improved methods of data communications with mobile devices. In particular, the invention includes a dynamic location-based (geo-spacial) Internet addressing scheme that is backward compatible with existing Internet protocols and architectures but provides improved data communications with large numbers of mobile devices.

BACKGROUND OF THE INVENTION

Internet

The Internet Protocol (IP) as we know it today was designed during the late 70's when a 32 bit ($2^{32}$ or as represented in 4–8 bit messages, e.g. 255.255.255.255 later called Ipv4) message permitted approximately 4.25 billion unique addresses. It was thought at that time this would be more than enough address space to satisfy future needs. IP was still experimental and was focused on by academia and for academia. Personal computers were still a prediction.

By the 90's it was clear that Ipv4 addressing was going to be exhausted, some thought as early as 1995. The result was the commissioning of Ipv6, through the development of a task force called Internet Engineering Task Force (IETF). A key charter for this task force was interoperability, forward and backward.

The basic structure of the new addressing scheme is a 128 bit message represented as 8–16 bit messages separated by a colon, and represented in a hex format, (e.g. FFFF:FFFF: . . . in hex, 65535:65535: . . . in dec. and 1111111111111111:1111111111111111: inbinary). The combination of available addresses is approximately $3.4 \times 10^{38}$ unique addresses, enough to certainly take care of network addressing for the next millennium if not the non-foreseeable future.

As part of the IETF scheme, a binary prefix has been set aside (100), which represents ⅛ of the available network addressing. This was set aside and made available for geographic-based addressing. Unicast is defined as a resolved or assigned address or a unique identifier for a single interface, i.e. a packet sent to a unicast address is delivered to the interface identified by that address.

TCP/IP represent connection/connectionless protocols in the Open Systems Interconnect (OSI) reference model. OSI is a standard reference model for communication between two end users in a network. It is used in developing products and understanding networks. The OSI Reference Model describes seven layers of related functions that are needed at each end when data is sent from one party to another party in a network. An existing network product or program can be described in part by where it fits into this layered structure. For example, TCP/IP is usually packaged with other Internet programs as a suite of products that support communication over the Internet. This suite includes the File Transfer Protocol (FTP), Telnet, the Hypertext Transfer Protocol (HTTP), e-mail protocols, and sometimes others.

The OSI model describes the flow of data in a network, any IP network, from the lowest layer (the physical connections i.e. cell phones) up to the layer containing the user's applications. Data going to and from the network is passed layer to layer. Each layer is able to communicate with the layer immediately above it and the layer immediately below it.

The OSI Reference Model includes seven layers:

1. The Application layer represents the level at which applications access network services. This layer represents the services that directly support applications.
2. The Presentation layer translates data from the Application layer into an intermediary format. This layer also manages security issues by providing services such as data encryption, and compresses data so that fewer bits need to be transferred on the network.
3. The Session layer allows two applications on different systems to establish, use, and end a session. This layer establishes dialog control between the two computers in a session, regulating which side transmits, plus when and how long it transmits.
4. The Transport layer handles error recognition and recovery. It also repackages long messages when necessary into small packets for transmission and, at the receiving end, rebuilds packets into the original message. The receiving Transport layer also sends receipt acknowledgments.
5. The Network layer addresses messages and translates logical addresses and names into physical addresses. It also determines the route from the source to the destination computer and manages traffic problems, such as switching, routing, and controlling the audio signals or data.
6. The Data Link layer packages raw bits from the Physical layer into frames (logical, structured packets for data). This layer is responsible for transferring frames from one computer to another, without errors. After sending a frame, it waits for an acknowledgment from the receiving computer.
7. The Physical layer transmits data from one system to another and regulates the transmission of data over a physical medium. This layer defines how the cable is attached to the device and what transmission technique is used to send data over the system.

When two devices communicate on a network, the software at each layer on one system assumes it is communicating with the same layer on the other system. For example, the Transport layer of one system communicates with the Transport layer on the other system. The Transport layer on the first system has no regard for how the communication actually passes through the lower layers of the first system, across the physical media, and then up through the lower layers of the second system.

Although TCP fits well into the Transport layer of OSI and IP into the Network layer, the other programs fit rather loosely (but not neatly within a layer) into the Session, Presentation, and Application layers. In this model, we include only Internet-related programs in the Network and higher layers. OSI can also be applied to other network environments to include voice. A set of communication products that conformed fully to the OSI reference model would fit neatly into each layer.

With the advent of Ipv6 or Ipng, the number of network interfaces can be expanded beyond the network to individual devices. A real time and secure unicast point essentially can be extended to the individual user through a concept called anycast, defined as a communication between a single sender and the nearest of several receivers in a group. The term exists in contradistinction to multicast, communication between a single sender and multiple receivers, and unicast, communication between a single sender and a single receiver in a network. Anycasting is designed to let one host initiate the efficient updating of routing tables for a group of hosts. IPv6 can determine which gateway host is closest and sends the packets to that host as though it were a unicast communication. In turn, that host can anycast to another host in the group until all routing tables are updated.

The anycast allows the unicast interface to now function as a unicast link to the device, its address is unique and its interface is virtual to the Internet backbone. By extending this concept to devices other than classical interface devices, e.g. a computer and network, and by further expanding the addressing scheme, we have created the ability to transfer data, for all intents and purposes, nearly real time and secure. Ipv6, unicast links and anycast are key elements to tunneling protocols, protocols needed to reduce network latency for data transfer.

Relative to the Internet, tunneling is using the Internet as part of a private secure network. The "tunnel" is the particular path that a given message or file might travel through the Internet. A protocol or set of communication rules called Point-to-Point Tunneling Protocol (PPTP) has been proposed that would make it possible to create a virtual private network through "tunnels" over the Internet. This would mean that devices would no longer need Independent Service Provider (ISP) support for wide-area communication but could securely use the public networks in near real time. PPTP, sponsored by Microsoft and other companies, and Layer 2 Forwarding, proposed by Cisco Systems, are among the main proposals for a new Internet Engineering Task Force (IETF) standard. With PPTP, which is an extension of the Internet's Point-to-Point Protocol (PPP), any user of a communications device with PPP client support will be able to use an ISP to connect securely to a device elsewhere in the domain.

PPP is a protocol for communication between two devices and is a full-duplex By protocol that can be used on various physical media, including twisted pair or fiber optic lines or satellite transmission. It uses a variation of High Speed Data Link Control (HDLC) for packet encapsulation. PPP is usually preferred over the earlier de facto standard Serial Line Internet Protocol (SLIP) because it can handle synchronous as well as asynchronous communication. PPP can share a line with other users and it has error detection that SLIP lacks. Where a choice is possible, PPP is preferred.

A virtual private network (VPN) is a private data network that makes use of the public telecommunication infrastructure, maintaining privacy through the use of a tunneling protocol and security procedures. A virtual private network can be contrasted with a system of owned or leased lines that can only be used by one company. The idea of the VPN is to give the user the same capabilities at much lower cost by sharing the public infrastructure. Phone companies have provided secure shared resources for voice messages.

A virtual private network makes it possible to have the same secure sharing of public resources for data. Users today are looking at using a virtual private network for both extranets and wide-area Intranets. Using a virtual private network involves encrypting data before sending it through the public network and decrypting it at the receiving end. An additional level of security involves encrypting not only the data but also the originating and receiving network addresses. Although as yet there is no standard protocol, Microsoft, 3Com, and several other companies have proposed a standard protocol, the Point-to-Point Tunneling Protocol (PPTP) and Microsoft has built the protocol into its Windows NT server.

GPS

The Global Positioning System or "GPS" was born as a result of the problems experienced by the US military forces during the Vietnam conflict. One of the main difficulties for the troops on the ground was how to keep in contact with each other, especially due to the harsh jungle terrain. A localized LORAN system was in use, but this was subject to the errors common to all radio systems, such as ground wave deflection and poor radio reception at night and in bad weather. The US then experimented with a system of 4 satellites, initially named TRANSIT. These were in high orbit above the earth and available to marine users as well as the military. However, the system was largely inaccurate, as position fixes could only be obtained every 2 hours at best.

The NavStar system was developed next and was operational in a limited way from 1986, but there was only 3–4 hours coverage per day due to the small number of satellites in orbit. The GPS system became "partially operational" when hostilities began in the Gulf in 1990. Here, experimental Block 1 satellites were used in addition to the established Block 2 satellites, thus giving a useable constellation of 21 satellites. The Department of Defense made the system operational for civilian users in 1990, which is the same GPS system we use today.

The GPS satellites orbit the earth twice a day, 11,000 miles above the earth, transmitting their precise position and elevation. The GPS receiver acquires the signal, then measures the interval between transmission and receipt of the signal to determine the distance between the receiver and the satellite. Once the receiver has calculated this data for at least 3 satellites, its location on the earth's surface can be determined.

Every satellite transmits almanac and ephemeris data. Almanac data is general information on the location and the health of each satellite in the constellation, which can be received from any satellite. A receiver with a current almanac in its memory knows where in the sky to look for satellites, given its last known position and the time of day. Ephemeris data is the precise satellite positioning information that is used by the GPS receiver to compute its position. Each satellite transmits its own ephemeris data.

There are also 2 distinct signal types emitted from the satellites; CA (Coarse Acquisition) and PPS (Precise Positioning System). CA coded signals can give 15 meter RMS (Root Mean Square) accuracy. However, the DOD has introduced a random error into the system, known as Selective Availability. This means that the satellites will randomly give out an error signal, thus degrading the accuracy of the signals to 100 meters officially, although accuracy is usually 50 meters. PPS is only available to licensed, mainly military, users and can give sub-1 meter accuracy.

With the advent of this technology, its subsequent commercialization, its evolution in size, cost and accuracy, GPS is rising to the surface as a technology available to systems not classically considered either compatible, available or necessary until the recent past.

Wireless Communications

Cellular (wireless) communications has evolved from analog to digital over the past few years. These streams of data are sent utilizing protocols standardized in the telecommunications industry. They are referred to as GSM, CDMA, TDMA etc., each one unique but developed as a voice under data concept. Some have evolved to purely digital but in the overall telecommunications network it is still voice on voice networks. These highspeed digital communications have the ability to be supported by TCP/IP in a purely digital environment.

Heretofore these three distinct fields of technology—Internet data communications, global positioning system and wireless communications have evolved largely independently; each addressing its own challenges and commercial markets. The present application results from rethinking these technologies in a broader context, and exploring ways in which they overlap, or could overlap, to provide new functionality and efficiencies. The need was identified to leverage and meld together selected aspects of these various technologies. More specifically, there is a need to accommodate large numbers of increasingly mobile users, while at the same time providing enhanced levels of data communication service.

One particular need is a way to communicate data to and from a mobile computing device. Data communication must be fast and reliable, notwithstanding that the computer or other mobile device may be moving all over the planet in unpredictable ways. Mobile data communications must also be compatible with existing networks and protocols—a major paradigm shift is not commercially viable.

SUMMARY OF THE INVENTION

The present invention generally comprises methods and apparatus for data communications with mobile devices such as laptop computers or wireless telephones. The invention provides a new method for addressing mobile devices that accommodates large numbers of such devices while ensuring that all such addresses are unique. The same method can be used advantageously for stationary devices as well. (Indeed, mobile devices are intermittently stationary, just as most stationary devices can be relocated.) The global positioning system offers any device a unique format and reference point on the planet. No two places on earth have the same location. By calculating the total population of unique addresses in terms of latitude and longitude at a resolution of 0.6 feet (e.g. −122 30.1255,45 28.3478), unique locations of approximately $2.16 \times 10^{16}$ can be achieved. One key aspect of the present invention is the use of global position to generate a globally-unique, Internet protocol (IPv4, IPv6) compatible addressing scheme. With the recent announcements by wireless telecommunications handset providers of the inclusion of GPS receivers in their products, the necessary global position data is readily available in a wireless phone, and in similar fashion can be integrated into virtually any electronic appliance. The invention enables unique applications to be incorporated into the transport and network layers of the system architecture.

A second key aspect of the invention is a paradigm shift in network architecture. The invention is backward compatible with existing networks and protocols, but it leverages them in a new way. Conventionally, mobile devices like a wireless phone or laptop computer were thought of as "clients" in a network architecture and communications software or "stacks" were arranged accordingly. The clients would communicate with and through a server. Initially, the server or host would assign an IP address to the client. (Typically using DHCP—the Dynamic Host Configuration Protocol.) Then the client could communicate with the rest of the world, through that server, using the assigned address. The server, acting as a gateway, would receive packets from the client, repackage them (encapsulate), and send them onto the broader network.

The present invention upends this conventional arrangement. According to the present invention, it is the "client" or end user device, such as a mobile phone or laptop computer, that assigns its own IP address, rather than look to a server or host. Thus we define a new DCCP: Dynamic Client Configuration Protocol. The client now acts as a server in that it can communicate directly onto the larger network, even the Internet, reducing the number of intermediate machines. Thus, this newly independent client, having assigned its own IP address (based on global location), can emulate a gateway or router, encapsulating its own packets as it chooses. Addresses are resolved from the client up, rather than from the host down as in prior art. This new paradigm has remarkable potential to traverse the Internet much faster than the prior art systems, driving communication latency and overhead far below present levels.

By driving the protocol stacks to the end user, as opposed to the base station in the wireless carrier's network, voice can evolve to a position of "voice over data" transport. The concepts of the present invention lay the foundation for integration of smart wireless devices, that can generate unique IP addressing schemes, that in turn support SLIP or PPP for anycast and unicast decentralization, tunneling protocols like PPTP that support VRN's, and the connection oriented protocol (TCP) for transport from the session to the network. The missing key element we have determined is an addressing scheme that supports all of the above in a unique way, such that resolved conflicting addresses are on the exception rather then the rule. The intelligence and control must be driven to the communications device in order to achieve effective routing real time data transfer.

Additional objects and advantages of this invention will be apparent from the following detailed description of preferred embodiments thereof which proceeds with reference to the accompanying drawings.

DETAILED DESCRIPTION OF A PREFERRED EMBODIMENT

Transfer Control Protocol/Internet Protocol (TCP/IP) has been classically defined or is at least thought of as connection and connectionless data transfer protocol for computer networks only. One aspect of this invention is expanding the definition of the interface addressable devices assigned an address (IP address) to include hardware, software and firmware platforms, that do data transfer for uses other not limited to computing. Uses other than computing include but are not limited to voice and video data. Voice data is analog signals converted to digital streams through analog to digital converters, CODECs. VOCODERs, etc.

In a satellite based communications system, a unique set of problems arise with respect to the communications architecture. The "tower" that hosts the user, or caller, is no longer stationary, it moves at 16,000 MPH; and for all intents and purposes the user and his network device is stationary. This reversal of classical roles, with respect to the current wireless network, requires network management in a non-conventional sense.

Intelligence for network management needs to be decentralized to the user. Unique addressing schemes are needed to support the role reversal. Geo-IP works through a protocol stack called Dynamic Client Configuration Protocol (DCCP), where the IP address is handed to the host as a unique node address. Conflicts that arise because of close proximity are resolved on the exception.

Figure 1:
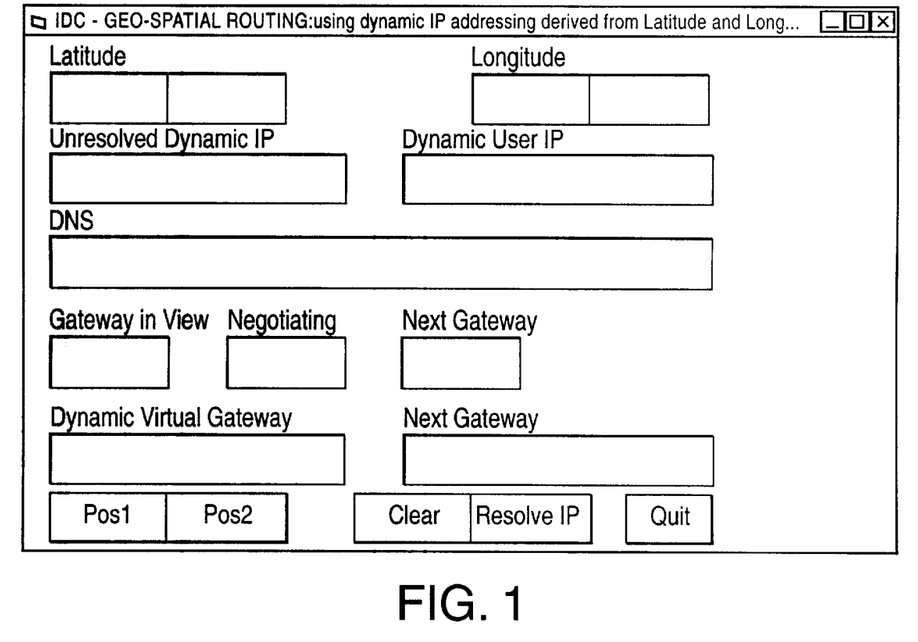
FIG. 1 is a screen shot illustrating operation of a geospacial routing method using dynamic IP addressing derived from location data according to the present invention.
Figure 2:
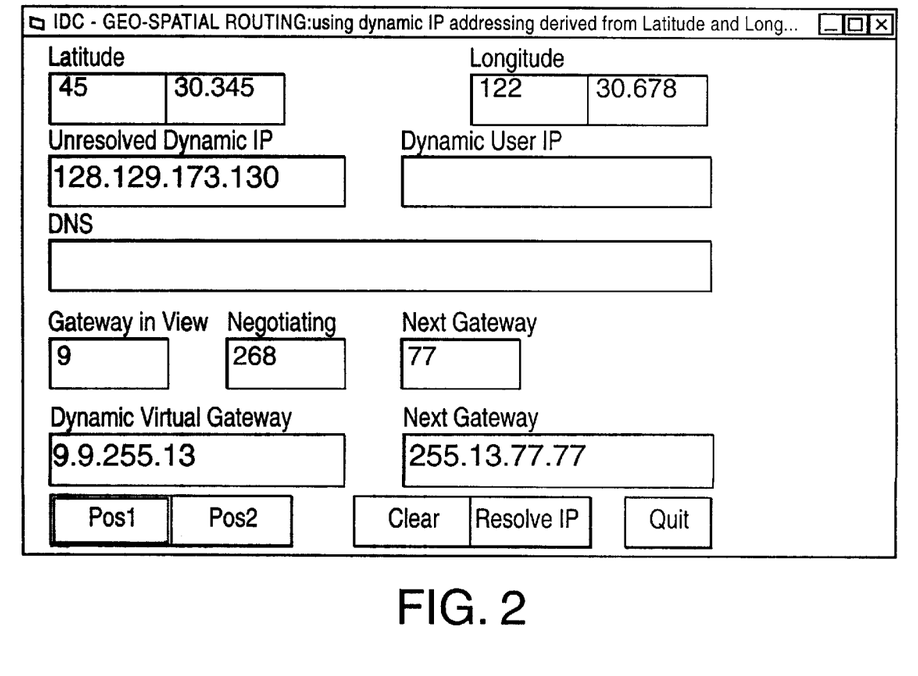
FIG. 2 is a screen shot as in FIG. 1 showing first location data, an unresolved dynamic IP (UDIP) address derived from the location data, in IPv4 compliant format, and showing physical gateway and dynamic virtual gateway (DVG) addresses.

Ipv4 utilizes 4 8-bit messages as defined above. The following figures describe a software platform embodiment of the conversion process to Ipv4. FIG. 1 represents a number of fields for data input and output. The terms in this figure represent new terms supporting the definition of geoAddressing using geoIP. FIG. 2 shows a users current latitude and longitude as well as the Unresolved Dynamic IP (UDIP), the Dynamic Virtual Gateway (DVG) in view and the next gateway. The DVG is a Virtual Unicast Link (VUL), with a unique name and an assigned address. It is a subnet or submask of the backbone. In operation, the user and his device "speak" to the Internet through the VUL to the DVG. The point it represents to the user is the host or VUL. During a handoff the next gateway in view assumes the role of the VUL. The resolved node and user do not know the DVG has changed, the node is still transferring data through the VUL.

Figure 3:
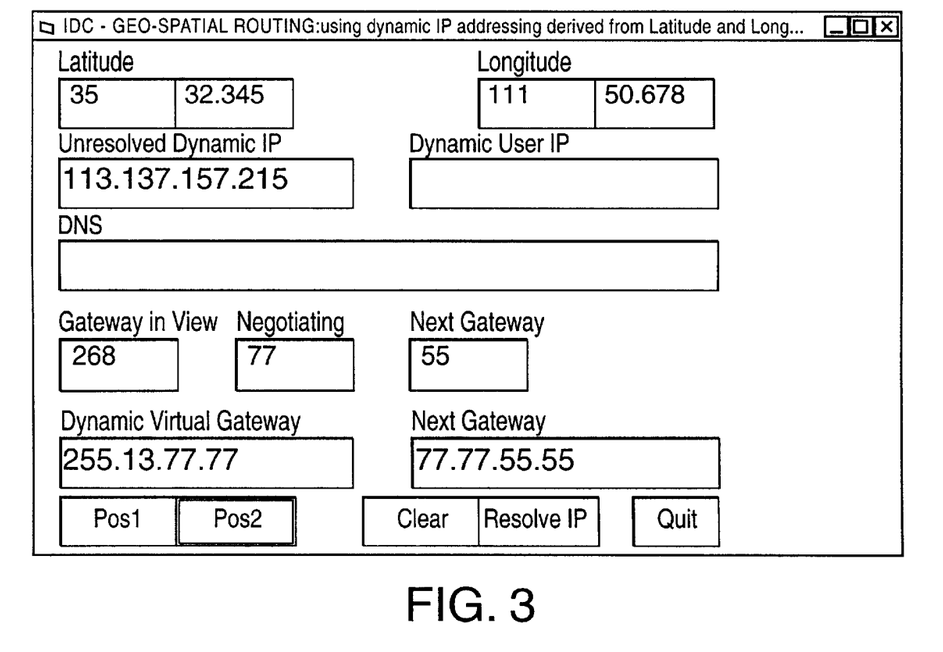
FIG. 3 is another screen shot as in FIG. 1, indicating a new location (latitude and longitude) of the mobile device.

The UDIP is a function of the GPS latitude and longitude. The UDIP will change constantly until resolved through the VUL. FIG. 3 shows a dynamic change to the user address. The user's location has changed, his UDIP has changed and he is reporting this to the network along with his domain and domain name.

In a conventional wireless system, the cell phone reports the Equipment Serial Number, Mobile Identification Number or other unique naming convention to the network. Combining the MIN with the cell site and sector, the network knows where the user can be reached. According to the present invention, the dynamic MIN or UDIP is the location of the user as derived from location data, e.g. provided by a GPS.

Figure 4:
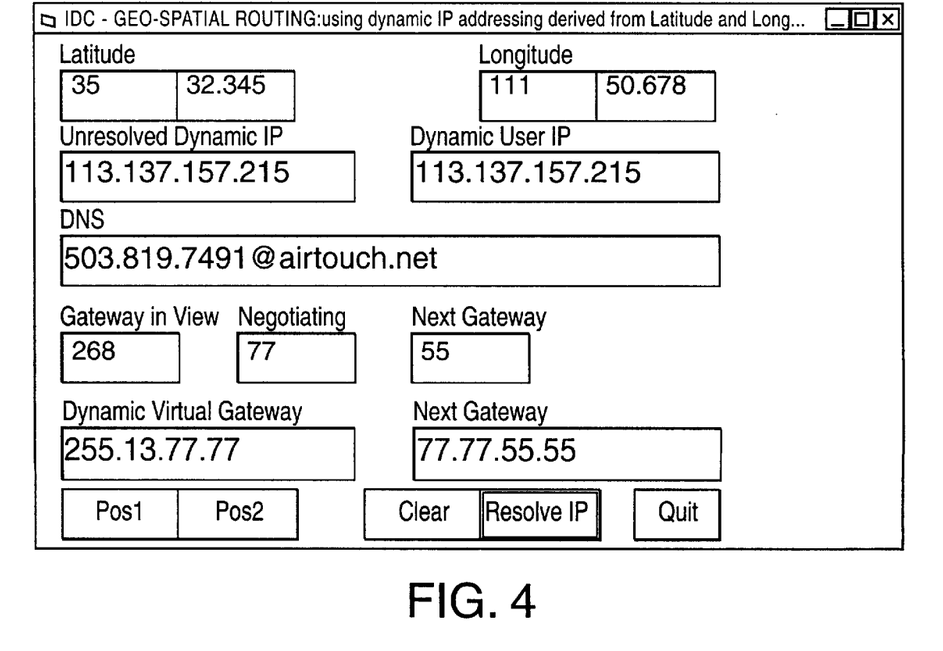
FIG. 4 illustrates a request through the VUL to resolve an address in order to establish a data transfer; the DCCP hands back to the network a unique address.
Figure 5:
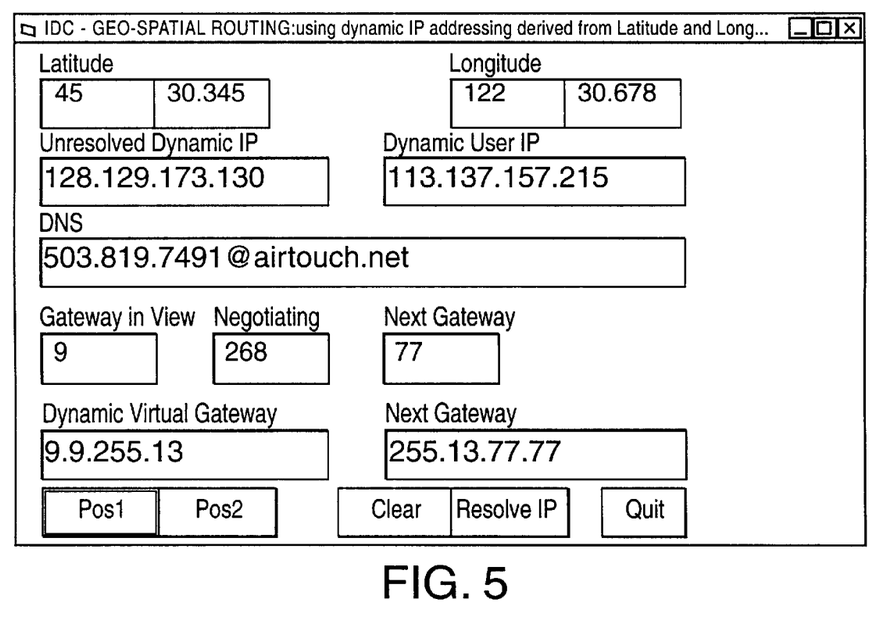
FIG. 5 illustrates a change of geoIP as supplied by the handset.
Figure 6:
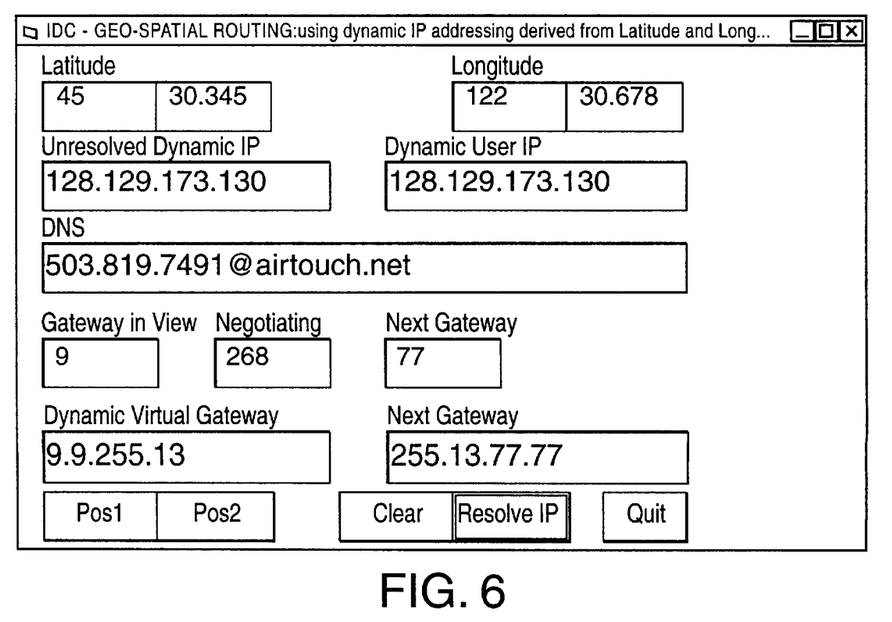
FIG. 6 represents a change in the geoIP that has been re-resolved back to the network.

Upon request through the VUL to resolve an address in order to establish a data transfer, the DCCP hands back to the network a unique address, see FIG. 4. A DNS name and DNS have been previously assigned, the DCCP gets the GPS latitude and longitude, converts it to the GeoIP and resolves the address as a unicast node. Data transfer can now occur. If the user's location changes, the network or the DCCP can re-resolve the geoIP, see FIG. 5. FIG. 5 represents a change of geoIP as supplied by the handset. FIG. 6 represents a change in the geoIP that has been re-resolved back to the network.

The dynamic ability to resolve a change in GeoIP satisfies numerous network management issues, such as where the call needs to go for an emergency call, as in 911. This leads to a need to develop geo-Spatial routers or routers sensitive to location based calls.

In addition to emergency applications, a UDIP resolved within a specified area, geo-fence, can be programmed to respond with a data exchange that is meaningful to the user, such as an advertised message. If the user is traveling down a freeway and crosses the geo-fence setup by the networks, resolves his new GeoIp within the GeoFence, a data message can be sent to the user from the network that represents meaningful information to the user at that location. In a commercial application the user can be sent a message advertising a product or service at a reduced rate. If many users pass the same point the anycast can include a multicast message, or geo-spatial multicast. If the area the geo-fence defines is 1 square mile, any user with a resolved address within the defined area will be sent the message.

In a second embodiment of the invention the data stream can include video as well as audio. Utilizing the geo-spatial anycast concept, predetermined routes can be established based on known location. In the case of fixed network nodes, a statically assigned value can be assigned rather than dynamically assigned by a GPS device. In the case of the anycast model, statically assigned addressing can assist in determining the nearest node or gateway in the network. Updating the routing tables will be on the exception, based on traffic, rather than the rule.

Figure 7:
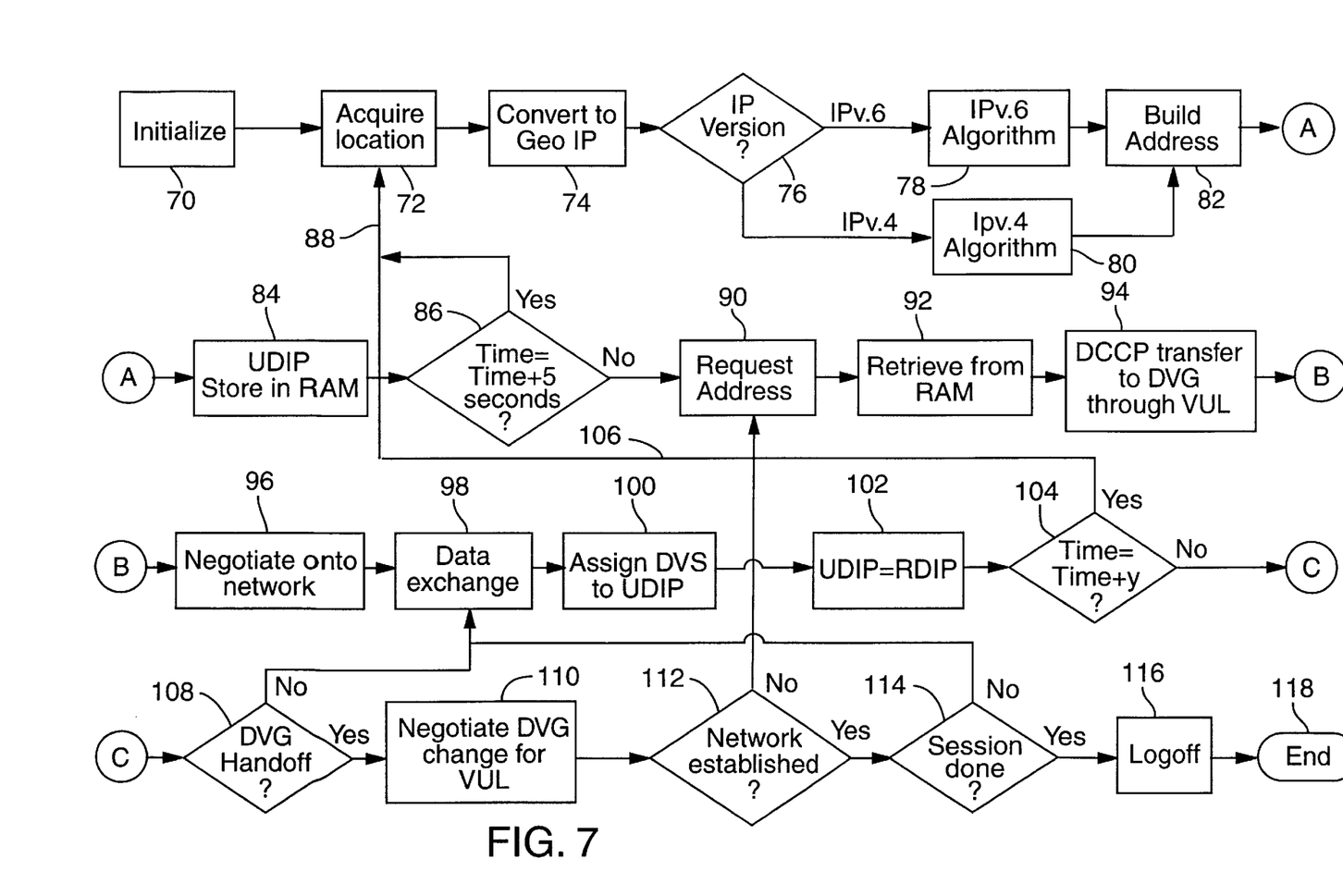
FIG. 7 is a flow diagram illustrating methods of geospacial addressing and data communications according to the invention.

FIG. 7 is a flow diagram illustrating a communication methodology according to the present invention. Step 70, initialization, can include several steps depending on the specific implementation. In general, memory registers, buffers, or the location determining technology device (e.g. GPS, SPS) are initialized by clearing the buffers, setting the registers, etc. This process starts with a network connection being made and a negotiation process is required.

Next, acquire location 72 comprises requesting a current latitude, longitude, altitude and time from the location determining source or device such as a GPS receiver.

Step 74 is to convert that location data into a geo-IP address as further explained below with reference to FIG. 8. An IP version or protocol is selected in step 76 (although it may be predetermined), and the corresponding conversion algorithm 78,80 is employed depending on the selected protocol. Then the IP address is assembled as farther detailed later, step 82. The geo-IP address is assembled utilizing information gathered from 72, and mobile identification number (MIN) so as to develop four, 16 bit unique, encrypted, fields.

If the address requirements from 76 are Ipv6, build an Ipv6 address of 8, 16 bit fields (binary) that include the MIN. The first 3 binary characters of field one will be 000 the remaining 13 will be an encryption key followed by the 7 remaining fields which include encrypted lat, long, time, mobile ID. If the request is for a v4 address, then retrieve from block 80 the Ipv4 as represented in four, 8 bit binary fields. In both cases (Ipv4, 6) make hex and decimal representation of the binary fields.

In step 84, the resulting UDIP is stored in RAM, as either of the three (hex, decimal, binary) representations of the IP address. Decision 86 indicates a loop timer where every 5 seconds a new position is acquired (step 72) and a new unresolved dynamic Internet protocol is stored in 84. Reference 88 identifies the timer loop path.

Step 90 is a request from the session manager for the UDIP (unresolved dynamic IP) address. It is retrieved from RAM in step 92. Referring to step 94, during the negotiation process the dynamic client configuration protocol (DCCP) transfers to the dynamic virtual gateway through the virtual unicast link (wireless device) the UDIP. This process, in which the client tells the server its dynamic "telephone number" or in this case, IP address, is squarely contrary to the prior art approach in which a server assigns an IP address to a requesting client.

The negotiation process 96 is an acceptance of the unique address with negotiation for conflict on the exception. In other words, if there is a conflict, the server will negotiate a new address. Upon completion of 96, a session is now established and data is exchanged in step 98. Step 100 is to assign a dynamic virtual gateway—i.e. plug user (or wireless device) into a communication socket. In step 102, the server will declare the unresolved dynamic IP is now a resolved network connection (RDIP).

Decision 104 indicates a loop timer with an undeclared variable Y, depending upon how often the server wants to build and re-resolve a new IP based on the geographical movement of the object. Variable Y, in other words the loop interval, can be determined as a function of speed and direction of travel. If time does not equal time plus the variable Y, the resolved dynamic IP stands (reference "C"). If time equals time plus Y, then loop back via path 106 to 72, build a new address, through the process to 102, re-resolve the new IP based on its change and location.

Step 108 is a DVG handoff. Another important aspect of the invention is that in a mobile environment the gateways may have to renegotiate the connection, as opposed to the client requesting a renegotiated connection. This happens seamlessly during the session. The dynamic virtual gateway is handed off to another server as necessary. Step 110 indicates the gateway negotiates the new server for the virtual unicast link.

Thus in 112 the network is seamlessly reestablished. Step 114 continues the session back to 98 (data exchange) until the session is done, and then logoff 116 and end at 118.

An illustrative algorithm for the conversion of latitude and longitude to form geoIP address is shown in pseudocode below.

```
Option Explicit
    Dim a As Double ' lat degrees
    Dim b As Double ' lat min
    Dim c As Double ' lon degrees
    Dim d As Double ' lon nin
    Dim e As Integer
    Dim f As Integer
    Dim g As Integer
    Dim h As Integer
    Dim I As Integer
    Dim j As Integer
    Dim k As Integer
    Dim i_1 As String
    Dim j_1 As String
    Dim k_1 As String
    Dim i_2 As String
    Dim j_2 As String
    Dim k_2 As String
    Dim l As String
    Dim m As String
    Dim n As String
    Dim p As String
    Dim q As String
    Dim r As String
    Dim s As String
    Dim u As String
    Dim v As String
    Dim w As String
    Dim x As String
    Private Sub Command1_Click()
    x=Text6.Text
    w=x
    Text7.Text=w
    Text5.Text="503.819.7491@airtouch.net"
    End Sub
    Private Sub Command2_Click()
    a=45
    b=30.345
    c=122
    d=30.678
    I=9
    j=268
    k=77
    e=(a+45) * 1.417
    f=(b *4.25)
    g=(c * 1.417)
    h=(d * 4.25)
    l=e
    m=f
    n=g
    p=h
    Text6.Text=1+"."+m+n+"."+p
    Text9.Text=k
    Text10.Text=I
    Text11.Text=j
    Text1.Text=a
    Text2.Text=b
    Text3.Text=c
    Text4.Text=d
    If I<=255 Then
    i_1=I
    i_2=I
    Else: i_1=255
    i_2=I-255
    End If
    If j<=255 Then
    j_1=j
    j_2=j
    Else: j_1=255
    j_2=j-255
    End If
    Text8.Text=i_1+"."+i+"."+j_1+"."+j_2
    k=55
    I=268
    j=77
    If I<=255 Then
    i_1=I
    i_2=I
    Else: i_1=255
    i_2=I-255
    End If
    If j<=255 Then
```

```
j_1=j
tj_2=j
Else: j_1=255
j_2=j-255
End If
Text12.Text=i_1 +"."+i_2 +"."+j_1+"."+j_2
End Sub
Private Sub Command 3_Click()
a=35
b=32.345
c=111
d=50.678
e=(a+45) * 1.417
f=(b * 4.25)
g=(c * 1.417)
h=(d * 4.25)
I=268
I=77
k=55
l=e
m=f
n=g
p=h
Text6.Text=1+"."+m+","+n+","+p
Text9.Text=k
Text 10.Text=I
Text 11.Text=j
Text1.Text=a
Text2.Text=b
Text3.Text=c
Text4.Text=d
If I<=255 Then
i_2=I
Else: i_1=255
i_2=I-255
End If
If j<=255 Then
j_1=j
j_2=j
Else: j_1 =255
j_2=j-255
End If
Text8.Text=i_1+","+i_2+","+j_1+","+j_2
k=112
I=77
j=55
If I<=255 Then
i_1=I
i_2=I
Else: i_1=255
i_2=I-255
End If
If j<=255 Then
j_1=j
j_2=j
Else: j_1=255
```

```
j_2=j-255
End If
Text12.Text=i_1+","+i_2+"."+j_1+"."+j_2
End Sub
Private Sub Command4_Click()
Text1.Text=""
Text2.Text=""
Text3.Text=""
Text4.Text=""
Text5.Text=""
Text6.Text=""
Text7.Text=""
Text8.Text=""
Text9.Text=""
Text10.Text=""
End Sub
Private Sub Command5_Click()
End
End Sub
End Sub
```

Figure 8A:
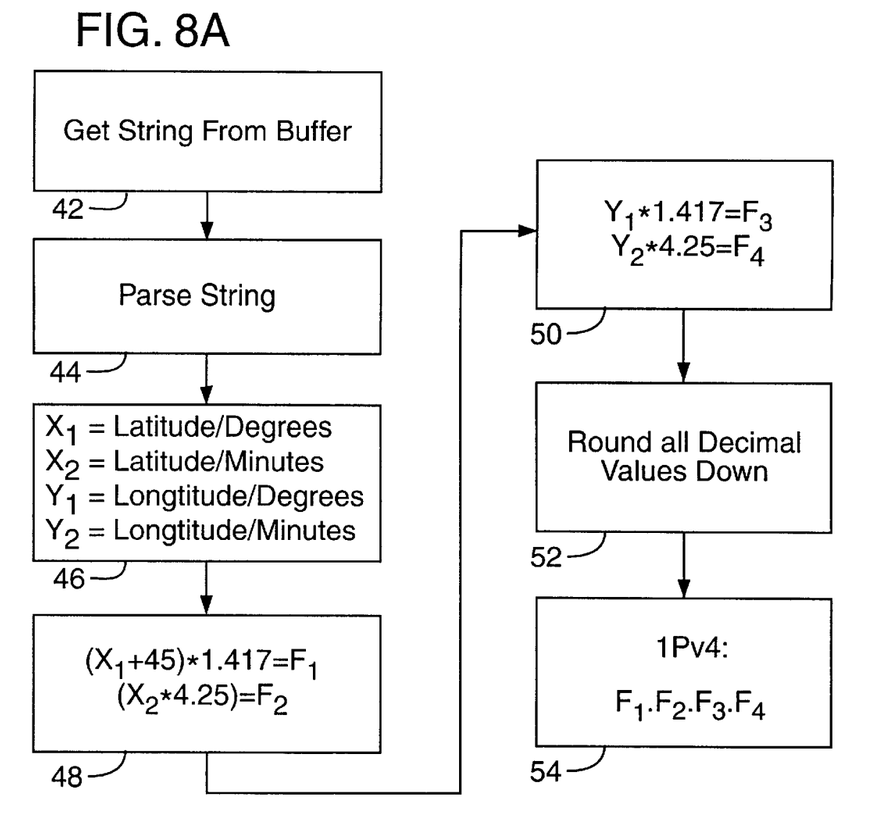
FIG. 8A is a flow diagram illustrating a method for converting location data so as to form an unresolved dynamic Internet protocol (UDIP) address.
Figure 8B:
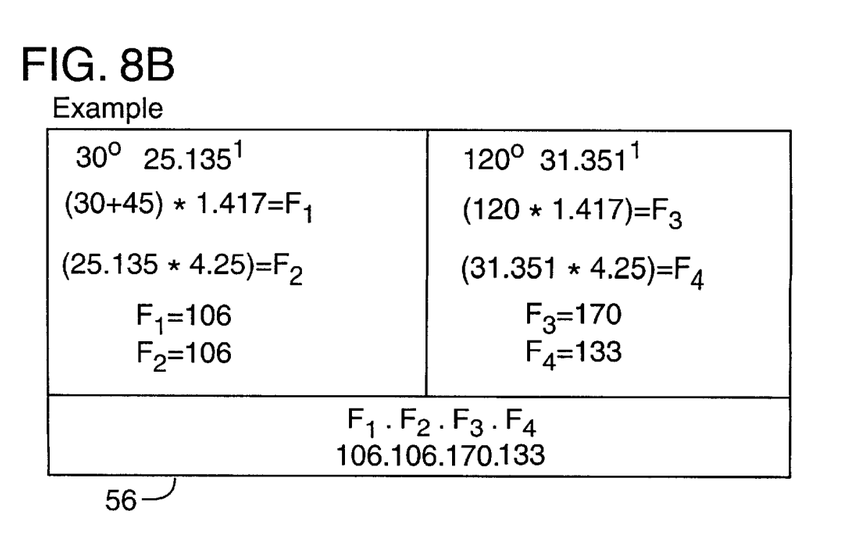
FIG. 8B is an example of a conversion from location data to a UDIP address.

The foregoing process can be more easily described with reference to a flow diagram—FIG. 8A. FIG. 8A is a flow diagram illustrating a method for converting location data so as to form an unresolved dynamic Internet protocol (UDIP) address. In this illustration, the UDIP address is IPv4 compliant. It can be formed to comply with other protocols. This process represents an expansion of block 80, 82 of FIG. 7. Referring now to FIG. 8A, "Get String from Buffer" step 42 calls for reading location data from a buffer memory. The data string is parsed, step 44, to identify and recover at least four data elements, as shown in step 46 the data elements are (1) latitude degrees; (2) latitude minutes; (3) longitude degrees; and (4) longitude minutes. These elements are identified by corresponding variable names, such as $X_1$, $X_2$, $Y_1$ and $Y_2$ respectively, although the variable names are arbitrary and merely for convenience. The latitude variable values are used in the formula shown in step 48 to calculate new values F1 and F2, and the longitude variables are substituted into the calculation shown in step 50, thereby forming four values $F_1$ through $F_4$, all within a range of 0–255. Next we round all decimal values down to the nearest whole number, step 52. Finally, the IPv4 format address is formed by concatenating $F_1$ through $F_4$, with period field delimiters, step 54. An example 56 of the conversion is shown in FIG. 8B.

Many other conversions could be used based on location data; the foregoing is but one example that is convenient for ease of calculation. All other conversions that form an IP protocol compliant address based on location data should be deemed equivalents of the method illustrated above. It is also within the scope of the invention to include altitude as part of the location data used to determine a unique address. Use of altitude avoids conflicts, for example, among devices within the same building but on different floors.

Conversion to Ipv6 would be considered a second embodiment of the method for geographic IP addressing. In the case of IPv6, a 128 bit message is available as explained above. Converting latitude and longitude from a conventional format to the geoIPv6 can be effected by changing the definition of the number of degrees in a circle. An appropriate algorithm would include a lowest common denominator that considers hex values, or multiples of 16, and arc measurements as multiples of 45. For this embodiment, 720 degrees is used in the algorithm as the number of degrees in a circle. This concept maximizes the hex presentation of the geoIP addressing scheme. If maximization is not required, the abundance of addressing available will support addressing schemes both conventional and non-conventional.

Utilizing the reserved prefix in the addressing scheme of 100 set aside for geographic addressing, this yields FFF (4095) unique sectors for geoIP. An address of 4F5B: yields a binary address of (100111101011011:). This represents (hex 4F5B4000=F5B (or 3931 in dec.). This can represent sector 3931 on the IP globe. The next 2–16 bit elements can represent directly the degrees and minutes within the sector or can be encrypted with variables derived from the GPS device.

It will be obvious to those having skill in the art that many changes may be made to the details of the above-described embodiment of this invention without departing from the underlying principles thereof. The scope of the present invention should, therefore, be determined only by the following claims.

What is claimed is:

1. A dynamic geo-spacial routing methodology for data communication with a wireless communications device comprising the steps of:

receiving GPS satellite transmissions in the wireless communications device;

acquiring current location data responsive to the GPS satellite transmissions: the current location data including at least latitude and longitude of the wireless communications device;

generating an unresolved dynamic IP (UDIP) address as a function of the current location data;

transmitting the UDIP address to a remote server for use in routing data communication with the wireless communications device so that the current location of the device determines a dynamic yet unique identifier for data communication;

identifying a first gateway on the Internet having a unique name and a predetermined assigned IP address;

assigning the selected gateway for temporary use as a dynamic virtual gateway;

presenting the designated DVG to the wireless communication device as a virtual host;

identifying a second gateway on the Internet having a unique name and a predetermined assigned IP address;

assigning the second gateway as a next gateway; and resolving the UDIP to form a resolved dynamic IP address for data communications between the wireless device and a selected one of the first and second gateways.

2. A method of data communication with a mobile device comprising the steps of:

in the mobile device, acquiring location data;

in the mobile device, converting the acquired location data to form a geo-IP address;

formatting the geo-IP address in conformance with a predetermined standard IP protocol thereby forming an unresolved dynamic IP (UDIP) address;

storing the UDIP in a memory in the mobile device;

periodically repeating the foregoing steps thereby updating the UDIP responsive to newly acquired location data;

requesting address resolution, including sending the stored UDIP to a host;

assigning a dynamic virtual gateway DVG to the UDIP;

combining the assigned DVG address together with the UDIP so as to form a resolved dynamic IP address (RDIP); and using the RDIP as an assigned IP address of the mobile device for data transfer.

3. A method according to claim 2 and further comprising:

monitoring an elapsed time since the location data was last updated;

if the elapsed time exceeds a predetermined time limit, reacquiring location data; and repeating the foregoing steps based on the newly acquired location data.

4. A method according to claim 2 including assigning a new DVG responsive to the newly acquired location data.

* * * * *